(12) United States Patent
Jang et al.

(10) Patent No.: US 8,122,981 B2
(45) Date of Patent: Feb. 28, 2012

(54) SOLAR CELL SYSTEM FOR VEHICLES AND CONTROL METHOD THEREOF

(75) Inventors: Kil Sang Jang, Daejeon-si (KR); Dae Woong Lee, Daejeon-si (KR)

(73) Assignee: Halla Climate Control Corporation, Daejeon-Si (KR)

( * ) Notice: Subject to any disclaimer, the term of this patent is extended or adjusted under 35 U.S.C. 154(b) by 386 days.

(21) Appl. No.: 12/593,404

(22) PCT Filed: Apr. 10, 2008

(86) PCT No.: PCT/KR2008/002017
§ 371 (c)(1),
(2), (4) Date: Sep. 28, 2009

(87) PCT Pub. No.: WO2008/127016
PCT Pub. Date: Oct. 23, 2008

(65) Prior Publication Data
US 2010/0116565 A1    May 13, 2010

(30) Foreign Application Priority Data

Apr. 16, 2007  (KR) .................. 10-2007-0036790
Apr. 10, 2008  (KR) .................. 10-2008-0033067

(51) Int. Cl.
*B60K 16/00* (2006.01)
(52) U.S. Cl. .......................... 180/2.2; 180/2.1
(58) Field of Classification Search ............ 180/65.31, 180/2.1, 2.2, 65.21; 320/100, 101, 102, 103; 454/137, 139, 141, 69; 296/211, 215, 210
See application file for complete search history.

(56) References Cited

U.S. PATENT DOCUMENTS

| | | | | |
|---|---|---|---|---|
| 3,943,726 A | * | 3/1976 | Miller | 180/65.31 |
| 4,009,051 A | * | 2/1977 | Kazis et al. | 320/102 |
| 4,592,436 A | * | 6/1986 | Tomei | 180/2.2 |
| 4,605,813 A | * | 8/1986 | Takeuchi et al. | 180/2.2 |
| 4,804,140 A | * | 2/1989 | Cantrell | 454/141 |
| 5,089,764 A | * | 2/1992 | Bobier et al. | 320/101 |
| 5,233,227 A | * | 8/1993 | Kajimoto et al. | 454/69 |
| 5,545,261 A | * | 8/1996 | Ganz et al. | 296/211 |
| 6,290,593 B1 | | 9/2001 | Weissbrich et al. | |

(Continued)

FOREIGN PATENT DOCUMENTS

| | | |
|---|---|---|
| DE | 4028242 A1 | 3/1992 |
| EP | 1 058 367 A2 | 12/2000 |
| JP | 12166124 A | 6/2000 |

(Continued)

*Primary Examiner* — Hau Phan
(74) *Attorney, Agent, or Firm* — Fulbright & Jaworski L.L.P

(57) ABSTRACT

A solar cell system for vehicles and a control method thereof, wherein even when a change of electric power generated from a solar cell is high, the variable voltage devices and the constant voltage devices selectively distribute the electric power according to the electric power without changing voltage. Accordingly, energy efficiency can be improved, the number of components can be reduced without using a voltage converter, and energy conversion loss can be decreased. Further, electric power generated from the solar cell is used for ventilation, air purification, cool and warmth, and convenience devices of a vehicle. Thus, a driver is provided with a controlled environment when riding on the vehicle. Accordingly, the present invention can meet a driver's requirements for the utilization of convenience devices and can provide a comfortable interior environment.

14 Claims, 3 Drawing Sheets

U.S. PATENT DOCUMENTS

| | | | |
|---|---|---|---|
| 6,439,658 B1 | 8/2002 | Ganz et al. | |
| 6,692,130 B1 * | 2/2004 | Snow | 454/137 |
| 6,808,450 B2 * | 10/2004 | Snow | 454/137 |
| 7,597,388 B1 * | 10/2009 | Samuel | 296/210 |
| 7,884,569 B2 * | 2/2011 | Ward | 320/101 |

FOREIGN PATENT DOCUMENTS

| | | |
|---|---|---|
| JP | 15246586 A | 9/2003 |
| JP | 15259565 A | 9/2003 |
| JP | 15111301 A | 11/2003 |
| JP | 2005-282428 A | 10/2005 |

* cited by examiner

[Fig. 1]
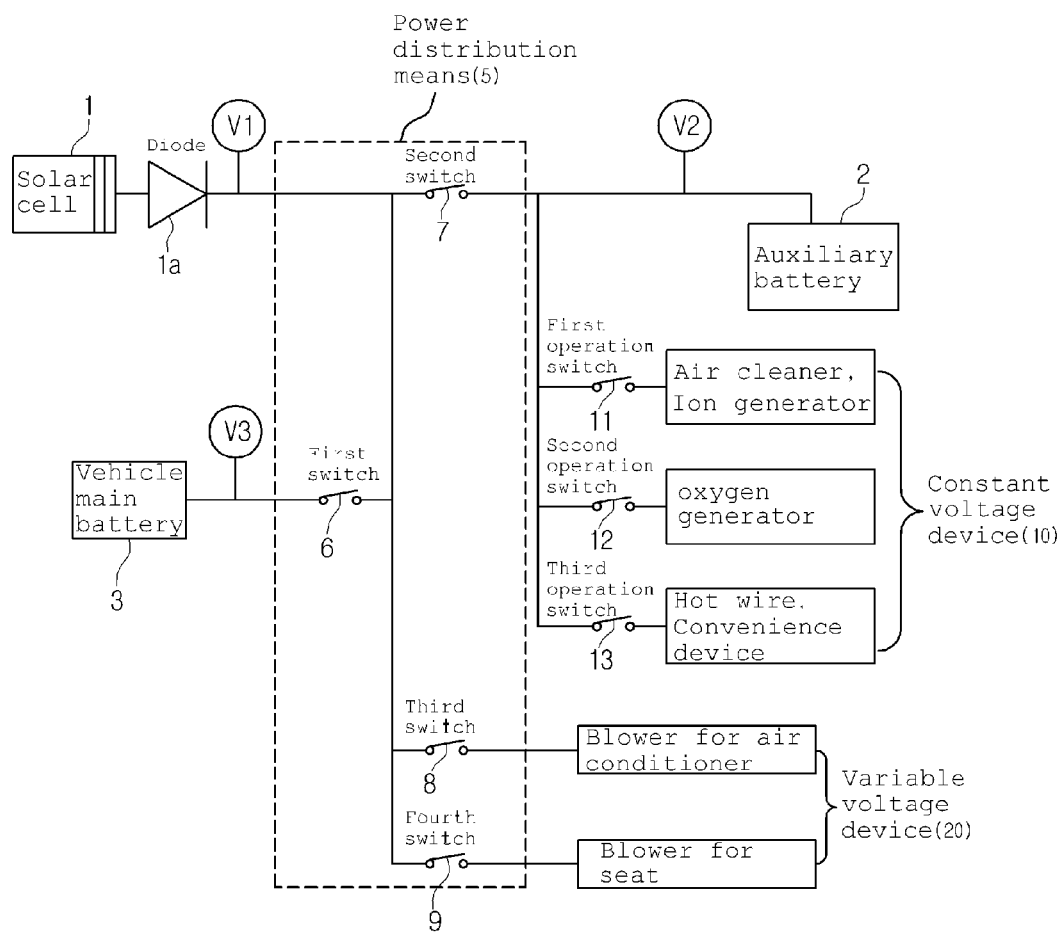

[Fig. 2]
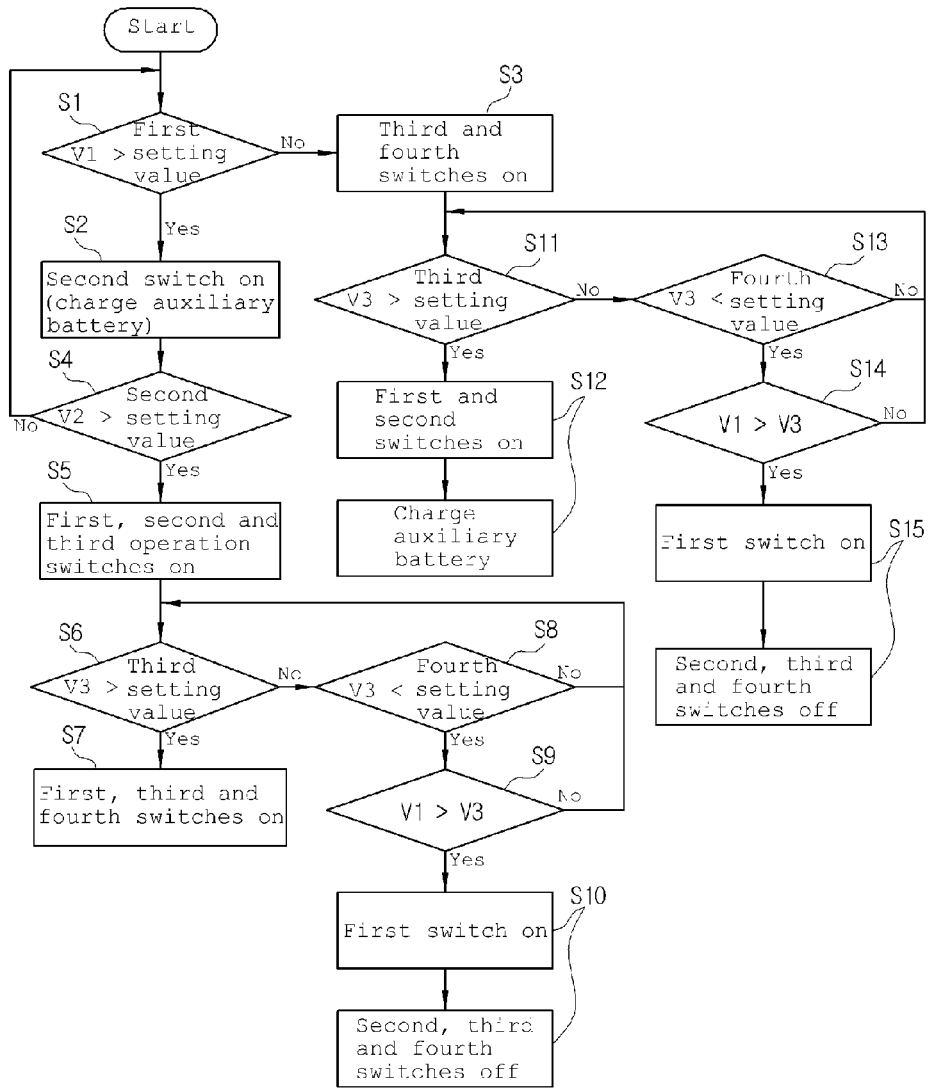

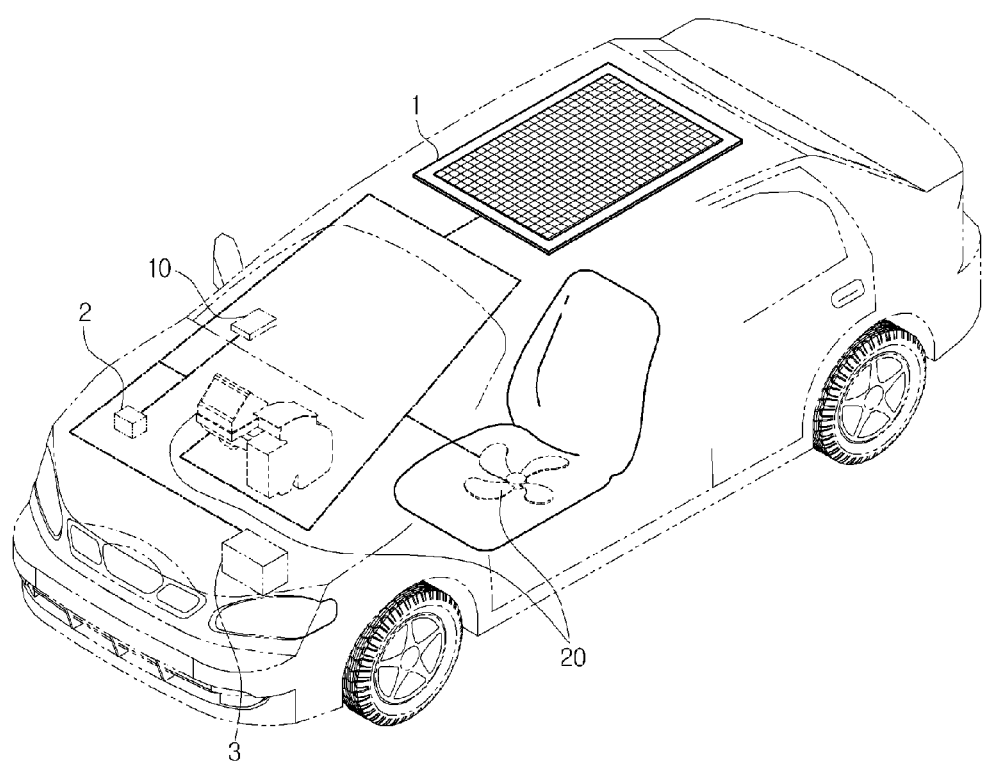
[Fig. 3]

SOLAR CELL SYSTEM FOR VEHICLES AND CONTROL METHOD THEREOF

RELATED APPLICATIONS

This application is a §371 of PCT/KR2008/002017 filed Apr. 10, 2008, which claims priority from Korean Patent Application No. KR-10-2007-0036790 filed Apr. 16, 2007 and KR-10-2008-0033067 filed Apr. 10, 2008.

TECHNICAL FIELD

The present invention relates to a solar cell system for vehicles and a control method thereof, and more particularly, to a solar cell system for vehicles and a control method thereof, in which electric power is selectively distributed to variable voltage devices and constant voltage devices according to electric power without changing voltage even when a change of electric power generated from a solar cell is high, thus increasing energy efficiency and reducing the number of components without using a voltage converter, in which a constant voltage devices are constantly driven using an auxiliary battery even when voltage generated from the solar cell is low, thus maximizing a practical use of solar cell electric power and also preventing damage to apparatuses due to voltage variation of the solar cell, and in which surplus electric power of the solar cell and a vehicle main battery is used to charge the auxiliary battery, thus increasing the operation time and capacity of the system.

BACKGROUND ART

In general, the number of vehicle articles using electricity in vehicles is gradually increased due to the development of electronic devices and consumption of electric power is increased accordingly.

In the prior art, when starting a vehicle with a main battery installed in the vehicle, electric power of the main battery is used. After the start-up, a generator connected to an engine generates electric power to charge the main battery, so the electric power is supplied to various electric articles/components. In this case, generated electric power is limited. Thus, if lots of electric articles (a fan for an air conditioner, a fan for seat air conditioning, an air cleaner, an ion generator, an oxygen generator, air conditioning and heating equipment, cooler and warmer, various AV devices, etc.) are used, there are shortcomings in that the output of the vehicle was lowered, fuel consumption was increased, and excessive load is applied to the vehicle and the main battery. When the main battery is discharged, there is no solution to prevent such discharge.

Further, there are lots of problems in that when the vehicle is not started, various electric articles cannot be used because electric power of the main battery is limited.

In order to solve the problems, technologies employing a solar cell have been developed. Among them, in U.S. Pat. No. 6,439,658, the solar cell arrangement is attached on the solar roof and the ventilation fans are installed in the vehicle seats. When the vehicle is parked, the seats are ventilated using electric power generated from the solar cell arrangement in order to drop the temperature of the seats. The ventilation fans for the seats are controlled by a controller. The fans are driven to lower the temperature of the seats using the temperature sensors of the seats. Further, when there is surplus electric power, electric power is supplied to the vehicle blower in order to ventilate the vehicle interior.

Furthermore, in U.S. Pat. No. 6,290,593, when the engine of a vehicle is stopped, electric power generated from the solar cell is supplied to the vehicle ventilation fan or is used to charge the battery of the vehicle. Further, a user uses electric power, generated from the solar cell, to ventilate the vehicle or to charge the battery using a switch that is manually operated.

DISCLOSURE OF INVENTION

Technical Problem

However, since a change of power occurring in the solar cell is severe, the prior art technologies are problematic in that voltage must be controlled using a DC/DC converter so as to operate several power consumption devices installed in the vehicle. Accordingly, there are problems in that the expenses are increased and energy efficiency is lowered through voltage conversion.

Furthermore, since voltage generated from the solar cell system is low, the voltage cannot be used to drive large-capacity devices or other functional devices. Further, problems arose because, since voltage generated from the solar cell is low, devices sensitive to voltage is damaged or durability of the devices is lowered when voltage varies due to the shift of the sun's ray.

Furthermore, there are caused problems in that, after the vehicle engine is started, a practical use of the solar cell is difficult, and functions such as necessary air conditioning and ventilation are not sufficiently performed since power generated from the solar cell is small.

Accordingly, the present invention has been made in view of the above problems occurring in the prior art, and an object of the present invention is to provide a solar cell system for vehicles and a control method thereof, in which electric power is selectively distributed to variable voltage devices and constant voltage devices according to electric power without changing voltage even when a change of electric power generated from a solar cell is high, thus increasing energy efficiency and reducing the number of components without using a voltage converter, in which a constant voltage device is constantly driven using an auxiliary battery even when voltage generated from the solar cell is low, thus maximizing a practical use of solar cell electric power and also preventing damage to apparatuses due to voltage variation of the solar cell, and in which surplus electric power of the solar cell and a vehicle main battery is used to charge the auxiliary battery, thus increasing the operation time and capacity of the system.

Technical Solution

To achieve the above object, the present invention includes a solar cell installed in a vehicle, the solar cell being configured to convert solar energy into electric energy and generate electric power, a vehicle main battery connected to the solar cell through a first switch, a auxiliary battery connected to the solar cell through a second switch and further connected to the vehicle main battery through the first switch and the second switch, the auxiliary battery configured to store surplus electric power of the solar cell or the vehicle main battery, a variable voltage device connected to the solar cell through a third switch and further connected to the vehicle main battery through the first switch and the third switch, wherein the variable voltage device is operated even when voltage is changed, a constant voltage device connected to the auxiliary battery through operation switches and configured to require a constant voltage, and power distribution means configured to control the first, second and third switches according to the amount of electric power generated from the solar cell and selectively distributing the electric power.

The present invention includes a first step S1 of comparing a voltage V1, generated from a solar cell 1, and a first setting value with each other, a second step S2 of charging an auxiliary battery 2 by turning on a second switch 7 if, as a result of the comparison at the first step S1, the voltage V1 of the solar cell 1 is greater than the first setting value, a third step S3 of driving the variable voltage devices 20 by turning on third and fourth switches 8 and 9 if, as a result of the comparison at the first step S1, the voltage V1 of the solar cell 1 is less than the first setting value, a fourth step S4 of comparing a voltage V2 of the auxiliary battery 2 and a second setting value with each other, after the second step S2 is performed, and a fifth step S5 of driving the constant voltage device 10 by turning on operation switches 11, 12 and 13 if, as a result of the comparison at the fourth step S4, the voltage V2 of the auxiliary battery 2 is greater than the second setting value.

Advantageous Effects

When a change of electric power generated from a solar cell is high, the variable voltage device and the constant voltage device selectively distribute the electric power according to the electric power without changing voltage. Accordingly, energy efficiency can be improved, the number of components can be reduced without using a voltage converter, and energy conversion loss can be decreased.

Further, electric power generated from the solar cell is used for ventilation, air purification, cool and warmth, and convenience devices of a vehicle. Thus, a driver can be provided with a controlled environment when riding on the vehicle. Accordingly, the present invention can meet a driver's requirements for the utilization of convenience devices and can provide a comfortable interior environment.

Further, when a generated voltage of a solar cell is low or when voltage or electric power is changed due to a change of the intensity of the sun's ray, constant voltage device, such as an air cleaner, can be operated always using the auxiliary battery. Accordingly, the utilization of solar cell power can be maximized and damage to devices according to a voltage change can be prevented.

Further, surplus electric power of a vehicle from a vehicle engine and a vehicle main battery and electric power generated from the solar cell can be used to charge the auxiliary battery. Thus, the operation time and capacity of a system can be increased and, therefore, even after the engine is stopped, several devices and a large-capacity device can be driven. Accordingly, the working ratio of ventilation, air purification, cool and warmth, and convenience devices of a vehicle can be increased.

Furthermore, electric power generated from the solar cell can be used to charge the vehicle main battery in an emergency. Accordingly, reliability of a vehicle can be improved.

BRIEF DESCRIPTION OF THE DRAWINGS

Further objects and advantages of the invention can be more fully understood from the following detailed description taken in conjunction with the accompanying drawings in which:

FIG. 1 is an overall construction showing a solar cell system for vehicles in accordance with the present invention;

FIG. 2 is a flowchart illustrating a method of controlling the solar cell system for vehicles in accordance with the present invention; and FIG. 3 is a schematic view illustrating a state where the solar cell system for vehicles in accordance with the present invention is installed in a vehicle.

MODE FOR THE INVENTION

The present invention will now be described in detail with reference to the accompanying drawings.

Repeated description of the same constructions and operations as those of the prior art is omitted.

FIG. 1 is an overall construction showing a solar cell system for vehicles in accordance with the present invention. FIG. 2 is a flowchart illustrating a method of controlling the solar cell system for vehicles in accordance with the present invention. FIG. 3 is a schematic view illustrating a state where the solar cell system for vehicles in accordance with the present invention is installed in a vehicle.

As shown in the drawings, the solar cell system for vehicles in accordance with the present invention includes a solar cell 1, a vehicle main battery 3, an auxiliary battery 2, a variable voltage device 20, a constant voltage device 10, and power distribution means 5.

First, the solar cell 1 is installed in a vehicle roof, a vehicle bonnet or the like. The solar cell 1 converts solar energy applied to the outside of the vehicle into electric energy and generates electric power. Further, a diode 1a for preventing reversal of current is disposed on one side of the solar cell 1.

When a vehicle is started, the vehicle main battery 3 supplies electric power to the vehicle. After the start-up of the vehicle, the vehicle main battery 3 is charged with electric power generated from a generator connected to an engine and also functions to supply various electric articles/components with the electric power.

This vehicle main battery 3 is connected to the solar cell 1 through a first switch 6.

Furthermore, the auxiliary battery 2 is connected to the solar cell 1 through a second switch 7 and also connected to the vehicle main battery 3 through the first switch 6 and the second switch 7. The auxiliary battery 2 stores (charges) surplus electric power of the solar cell 1 or the vehicle main battery 3.

That is, when a voltage V1 generated from the solar cell 1 is higher than a minimum voltage (about 12V) which can charge the auxiliary battery 2, the second switch 7 is turned on, so the auxiliary battery 2 is charged with electric power received from the solar cell 1. When the voltage V1 of the solar cell 1 is lower than the minimum voltage, the second switch 7 is turned off, so the connection of the auxiliary battery 2 to the solar cell 1 is shut off. Here, when a voltage V2 of the auxiliary battery 2 is charged higher than a minimum voltage (about 10V or higher) which can drive the constant voltage device 10 to be described later on, the voltage V2 drives the constant voltage device 10.

Furthermore, when a charged amount of the vehicle main battery 3 is sufficient such as in the case of the start-up of the engine, the first and second switches 6,7 are turned on, so that surplus electric power of the vehicle main battery 3 is used to charge the auxiliary battery 2 or drive other devices.

Furthermore, the constant voltage device 10 is connected to the auxiliary battery 2 through operation switches 11, 12 and 13. The constant voltage devices 10 are devices requiring a constant voltage, and can include, for example, an air cleaner, an ion generator, an oxygen generator, a hot wire, a convenience device, etc.

The constant voltage device 10 is connected to the auxiliary battery 2 through independent operation switches 11, 12 and 13, respectively. Although the drawing shows that the air cleaner and the ion generator are connected to the auxiliary battery 2 through the first operation switch 11, the oxygen generator is connected to the auxiliary battery 2 through the second operation switch 12, and the hot wire and the convenience device are connected to the auxiliary battery 2 through the third operation switch 13, the above examples are only illustrative and various modifications are possible.

Meanwhile, the constant voltage device 10 is driven only when a constant voltage is supplied thereto. Thus, when the voltage V2 of the auxiliary battery 2 is charged higher than a minimum voltage or more, which can drive the constant voltage device 10, the first, second and third operation switches 11, 12 and 13 are selectively turned on and driven.

The auxiliary battery 2 is also charged by not only the solar cell 1, but also the vehicle main battery 3 when the engine is operated and therefore always maintains a sufficiently charged state. Thus, when the engine is stopped or the vehicle is parked, the constant voltage device 10 such as the air cleaner can be operated always. Accordingly, a driver can be provided with a comfortable environment when riding on a vehicle.

Furthermore, the variable voltage devices 20 are connected to the solar cell 1 through a third switch 8 and also connected to the vehicle main battery 3 through the first switch 6 and the third switch 8. The variable voltage device 20 is not sensitive to voltage and can be driven without problems although they are supplied with irregular voltage such as a low voltage and a high voltage. The variable voltage device 20 can include at least one of a blower for an air conditioner and a blower for the seats.

Meanwhile, when the variable voltage device 20 includes a blower for the air conditioner and a blower for the seats, the blower for the air conditioner is connected to the solar cell 1 through the third switch 8 and also connected to the vehicle main battery 3 through the first switch 6 and the third switch 8. The blower for the seats is connected to the solar cell 1 through a fourth switch 9 and also connected to the vehicle main battery 3 through the first switch 6 and the fourth switch 9.

These variable voltage devices 20 can be driven even at a low voltage. Thus, when the voltage V1 of the solar cell 1 is lower than a minimum voltage that can charge the auxiliary battery 2, the variable voltage device 20 can be driven by turning off the second switch 7 and turning on the third and fourth switches 8, 9.

Furthermore, when a charged amount of the vehicle main battery 3 is sufficient and the vehicle main battery 3 has a sufficiently high voltage, the auxiliary battery 2 can be charged and the variable voltage device 20, such as a blower that consumes more power as increasing the stage by turning on the first, third, and fourth switches 6, 8 and 9, can also be driven.

Furthermore, the power distribution means 5 controls the first to fourth switches 6, 7, 8 and 9 according to the amount of electric power generated from the solar cell 1 so as to selectively distribute the electric power to the variable voltage device 20 and the constant voltage device 10.

That is, as described above, when the voltage V1 generated from the solar cell 1 is higher than a minimum voltage that can charge the auxiliary battery 2, the power distribution means 5 charges the auxiliary battery 2 and also drives the constant voltage device 10, connected to the auxiliary battery 2 through the operation switches 11, 12 and 13, by turning on the second switch 7 and turning off the third and switches 8, 9. When the voltage V1 generated from the solar cell 1 is lower than a minimum voltage that can charge the auxiliary battery 2, the power distribution means 5 drives the variable voltage device 20 by turning off the second switch 7 and turning on the third and fourth switches 8, 9.

Furthermore, when a charged amount of the vehicle main battery 3 is sufficient irrespective of when the engine is operated or stopped, the power distribution means 5 uses surplus electric power to charge the auxiliary battery 2 by turning on the first and second switches 6, 7, or uses surplus electric power to drive even the variable voltage device 20, which consume relatively great power, by turning on the first, third and fourth switches 6, 8 and 9.

Meanwhile, when a voltage V3 of the vehicle main battery 3 is less than a discharge voltage limit, the power distribution means 5 uses electric power, generated from the solar cell 1, to charge the vehicle main battery 3 by turning on the first switch 6 and turning off all the second, third and fourth switches 7, 8 and 9. Therefore, reliability of a vehicle can be improved in an emergency, load to the generator can be reduced, and fuel efficiency can be improved through the charging function of the vehicle main battery 3.

Hereinafter, a method of controlling the solar cell system for vehicles constructed above in accordance with the present invention is described with reference to FIG. 2.

First, a first step S1 in which the voltage V1 generated from the solar cell 1 is compared with a first setting value is performed.

If, as a result of the comparison at the first step S1, the voltage V1 of the solar cell 1 is greater than the first setting value, a second step S2 in which the second switch 7 is turned on to thereby charge the auxiliary battery 2 is performed. If, as a result of the comparison at the first step S1, the voltage V1 of the solar cell 1 is less than the first setting value, a third step S3 in which the third and fourth switches 8, 9 are turned on to thereby drive the variable voltage device 20 is performed.

The first setting value is a minimum voltage (about 12V) that can charge the auxiliary battery 2.

As described above, the power distribution means 5 determines to which electric power is to be distributed depending on voltage of the solar cell 1. Here, when the voltage V1 generated from the solar cell 1 is greater than a minimum voltage that can charge the auxiliary battery 2, the power distribution means 5 charges the auxiliary battery 2 and also drives the constant voltage device 10 using the auxiliary battery 2, by turning on the second switch 7 and turning off the third and fourth switches 8, 9. When the voltage V1 generated from the solar cell 1 is lower than a minimum voltage that can charge the auxiliary battery 2, the power distribution means 5 drives the variable voltage device 20, which are insensitive to voltage and can be driven at a low voltage, by turning off the second switch 7 and turning on the third and fourth switches 8, 9.

Thereafter, after the second step S2 is carried out, a fourth step S4 is performed in which the voltage V2 of the auxiliary battery 2 is compared with a second setting value.

If, as a result of the comparison at the fourth step S4, the voltage V2 of the auxiliary battery 2 is greater than the second setting value, a fifth step S5 is performed in which the operation switches 11, 12 and 13 are turned on to thereby drive the constant voltage device 10. When the constant voltage devices 10 is plural in number, the first to third operation switches 11, 12 and 13 can be turned on selectively in order to selectively drive the constant voltage device 10.

If, as a result of the comparison at the fourth step S4, the voltage V2 of the auxiliary battery 2 is lower than the second setting value, the process returns to the first step S1.

Here, the second setting value is a minimum voltage (about 10V) that can drive the constant voltage device 10.

After the fifth step S5 is performed, a sixth step S6 in which the voltage V3 of the vehicle main battery 3 is compared with a third setting value is performed.

If, as a result of the comparison at the sixth step S6, the voltage V3 of the vehicle main battery 3 is greater than the third setting value, a seventh step S7 is performed in which the first switch 6 and the third and fourth switches 8, 9 are turned on to thereby drive the variable voltage device 20.

If, as a result of the comparison at the sixth step S6, the voltage V3 of the vehicle main battery 3 is less than the third setting value, an eighth step S8 in which the voltage V3 of the vehicle main battery 3 is compared with a fourth setting value is performed.

Here, the third setting value is a reference voltage for determining whether a charged amount of the vehicle main battery 3 is sufficient.

That is, it can be known whether a charged amount of the vehicle main battery 3 is sufficient by measuring the voltage V3 of the vehicle main battery 3. When the charged amount is higher, the voltage V3 of the vehicle main battery 3 is higher, and when the charged amount is lower, the voltage V3 of the vehicle main battery 3 is lower. Therefore, only when the charged amount of the vehicle main battery 3 is sufficient as a result of measuring the voltage V3 of the vehicle main battery 3, the variable voltage device 20 that consumed relatively great power are driven by turning on the first, third and fourth switches 6, 8, 9. Here, when the voltage of the auxiliary battery 2 is low, the auxiliary battery 2 can be charged as much as the voltage V3 of the vehicle main battery 3 by turning on the first and second switches 6,7.

Thereafter, if, as a result of the comparison at the eighth step S8, the voltage V3 of the vehicle main battery 3 is less than the fourth setting value, a ninth step S9 in which the voltage V1 of the solar cell 1 is compared with the voltage V3 of the vehicle main battery 3 is performed. If, as a result of the comparison at the ninth step S9, the voltage V1 of the solar cell 1 is greater than the voltage V3 of the vehicle main battery 3, a tenth step S10 in which the vehicle main battery 3 is charged by turning on the first switch 6 and turning off the second, third and fourth switches 7, 8 and 9 is performed.

If, as a result of the comparison at the eighth step S8, the voltage V3 of the vehicle main battery 3 is greater than the fourth setting value or if, as a result of the comparison at the eighth step S9, the voltage V1 of the solar cell 1 is less than the voltage V3 of the vehicle main battery 3, the process returns to the sixth step S6.

Here, the fourth setting value is a reference voltage for determining whether the vehicle main battery 3 has reached the limit of a discharge voltage.

That is, when the voltage V3 of the vehicle main battery 3 is less than the limit of the discharge voltage and the voltage V1 generated from the solar cell 1 is higher than the voltage V3 of the vehicle main battery 3, the generated power of the solar cell 1 is all used to charge the vehicle main battery 3. Thus, reliability of a vehicle can be improved through the charging function of the vehicle main battery 3 in an emergency.

Furthermore, after the third step S3 is performed, an eleventh step S11 in which the voltage V3 of the vehicle main battery 3 is compared with the third setting value (the reference voltage for determining whether a charged amount of the vehicle main battery 3 is sufficient) is performed.

If, as a result of the comparison at the eleventh step S11, the voltage V3 of the vehicle main battery 3 is greater than the third setting value, a twelfth step S12 in which the first switch 6 and the second switch 7 are turned on in order to charge the auxiliary battery 2 is performed.

If, as a result of the comparison at the eleventh step S11, the voltage V3 of the vehicle main battery 3 is less than the third setting value, a thirteenth step S13 in which the voltage V3 of the vehicle main battery 3 is compared with the fourth setting value (the reference voltage for determining whether the vehicle main battery 3 has reached the limit of a discharge voltage) are performed.

That is, only when a charged amount of the vehicle main battery 3 is sufficient as a result of measuring the voltage V3 of the vehicle main battery 3, the first and second switches 6,7 are turned on in order to charge the auxiliary battery 2 as much as the voltage V3 of the vehicle main battery 3.

Thereafter, if, as a result of the comparison at the thirteenth step S13, the voltage V3 of the vehicle main battery 3 is less than the fourth setting value, a fourteenth step S14 in which the voltage V1 of the solar cell 1 is compared with the voltage V3 of the vehicle main battery 3 is performed.

If, as a result of the comparison at the fourteenth step S14, the voltage V1 of the solar cell 1 is higher than the voltage V3 of the vehicle main battery 3, a fifteenth step S15 in which the vehicle main battery 3 is charged with the entire electric power generated from the solar cell 1 by turning on the first switch 6 and turning off the second, third and fourth switches 7, 8 and 9 is performed.

If, as a result of the comparison at the thirteenth step S13, the voltage V3 of the vehicle main battery 3 is greater than the fourth setting value or if, as a result of the comparison at the fourteenth step S14, the voltage V1 of the solar cell 1 is lower than the voltage V3 of the vehicle main battery 3, the process returns to the eleventh step S11.

INDUSTRIAL APPLICABILITY

According to the present invention, even when a change of electric power generated from a solar cell is high, the variable voltage device and the constant voltage device selectively distribute the electric power according to the electric power without changing voltage. Accordingly, energy efficiency can be improved, the number of components can be reduced without using a voltage converter, and energy conversion loss can be decreased.

Further, electric power generated from the solar cell is used for ventilation, air purification, cool and warmth, and convenience devices of a vehicle. Thus, a driver can be provided with a controlled environment when riding on the vehicle. Accordingly, the present invention can meet a driver's requirements for the utilization of convenience devices and can provide a comfortable interior environment.

Further, when a generated voltage of a solar cell is low or when voltage or electric power is changed due to a change of the intensity of the sun's ray, constant voltage device, such as an air cleaner, can be operated always using the auxiliary battery. Accordingly, the utilization of solar cell power can be maximized and damage to devices according to a voltage change can be prevented.

Further, surplus electric power of a vehicle from a vehicle engine and a vehicle main battery and electric power generated from the solar cell can be used to charge the auxiliary battery. Thus, the operation time and capacity of a system can be increased and, therefore, even after the engine is stopped, several devices and a large-capacity device can be driven. Accordingly, the working ratio of ventilation, air purification, cool and warmth, and convenience devices of a vehicle can be increased.

Furthermore, electric power generated from the solar cell can be used to charge the vehicle main battery in an emergency. Accordingly, reliability of a vehicle can be improved.

The invention claimed is:

1. A solar cell system for vehicles, comprising:
a solar cell installed in a vehicle, the solar cell being configured to convert solar energy into electric energy and generate electric power;
a vehicle main battery connected to the solar cell through a first switch;
a auxiliary battery connected to the solar cell through a second switch and further connected to the vehicle main battery through the first switch and the second switch, the auxiliary battery configured to store surplus electric power of the solar cell or the vehicle main battery;
a variable voltage device connected to the solar cell through a third switch and further connected to the vehicle main battery through the first switch and the third switch, wherein the variable voltage device is operated even when voltage is changed;
a constant voltage device connected to the auxiliary battery through operation switches and configured to require a constant voltage; and
power distribution means configured to control the first, second and third switches according to the amount of electric power generated from the solar cell and selectively distributing the electric power.

2. The solar cell system of claim 1, wherein a diode for preventing reversal of current is disposed on one side of the solar cell.

3. The solar cell system of claim 1, wherein the constant voltage devices include at least one of an air cleaner, an ion generator, an oxygen generator and convenience devices and are connected to the auxiliary battery through the operation switches.

4. The solar cell system of claim 1, wherein the variable voltage devices include at least one of a blower for an air conditioner and a blower for seats.

5. The solar cell system of claim 4, wherein when the variable voltage devices include both the blower for the air conditioner and the blower for the seats, the blower for the air conditioner is connected to the solar cell through the third switch and further connected to the vehicle main battery through the first switch and the third switch, and the blower for the seats is connected to the solar cell through a fourth switch and further connected to the vehicle main battery through the first switch 6 and the fourth switch 9.

6. A method of controlling a solar cell system for vehicles, which comprises:
a first step S1 of comparing a voltage V1, generated from a solar cell, and a first setting value with each other;
a second step S2 of charging an auxiliary battery by turning on a second switch if, as a result of the comparison at the first step S1, the voltage V1 of the solar cell is greater than the first setting value;
a third step S3 of driving the variable voltage device by turning on third and fourth switches if, as a result of the comparison at the first step S1, the voltage V1 of the solar cell is less than the first setting value;
a fourth step S4 of comparing a voltage V2 of the auxiliary battery and a second setting value with each other, after the second step S2 is performed; and
a fifth step S5 of driving the constant voltage device by turning on operation switches if, as a result of the comparison at the fourth step S4, the voltage V2 of the auxiliary battery is greater than the second setting value.

7. The method of claim 6, further comprising:
a sixth step S6 of comparing a voltage V3 of a vehicle main battery and a third setting value with each other, after the fifth step S5 is performed;
a seventh step S7 of driving the variable voltage device by turning on a first switch 6 and the third and fourth switches if, as a result of the comparison at the sixth step S6, the voltage V3 of the vehicle main battery is greater than the third setting value;
an eighth step S8 of, if, as a result of the comparison at the sixth step S6, the voltage V3 of the vehicle main battery is less than the third setting value, comparing the voltage V3 of the vehicle main battery and a fourth setting value with each other;
a ninth step S9 of comparing the voltage V1 of the solar cell and the voltage V3 of the vehicle main battery with each other if, as a result of the comparison at the eighth step S8, the voltage V3 of the vehicle main battery is less than the fourth setting value; and
a tenth step S10 of charging the vehicle main battery by turning on the first switch and turning off the second, third and fourth switches if, as a result of the comparison at the ninth step S9, the voltage V1 of the solar cell is higher than the voltage V3 of the vehicle main battery.

8. The method of claim 7, wherein the third setting value is a reference voltage for determining whether a charged amount of the vehicle main battery is sufficient.

9. The method of claim 7, wherein the fourth setting value is a reference voltage for determining whether the vehicle main battery has reached a limit of a discharge voltage.

10. The method of claim 6, further comprising:
an eleventh step S11 of comparing a voltage V3 of a vehicle main battery and a third setting value with each other, after the third step S3 is performed;
a twelfth step S12 of charging the auxiliary battery by turning on a first switch 6 and the second switch if, as a result of the comparison at the eleventh step S11, the voltage V3 of the vehicle main battery is greater than the third setting value;
a thirteenth step S13 of comparing the voltage V3 of the vehicle main battery and a fourth setting value with each other if, as a result of the comparison at the eleventh step S11, the voltage V3 of the vehicle main battery is less than the third setting value;
a fourteenth step S14 of comparing the voltage V1 of the solar cell and the voltage V3 of the vehicle main battery with each other if, as a result of the comparison at the thirteenth step S13, the voltage V3 of the vehicle main battery is less than the fourth setting value; and
a fifteenth step S15 of charging the vehicle main battery by turning on the first switch 6 and turning off the second, third and fourth switches if, as a result of the comparison at the fourteenth step S14, the voltage V1 of the solar cell is greater than the voltage V3 of the vehicle main battery 3.

11. The method of claim 10, wherein the third setting value is a reference voltage for determining whether a charged amount of the vehicle main battery is sufficient.

12. The method of claim 10, wherein the fourth setting value is a reference voltage for determining whether the vehicle main battery has reached a limit of a discharge voltage.

13. The method of claim 6, wherein the first setting value is a minimum voltage that can charge the auxiliary battery.

14. The method of claim 6, wherein the second setting value is a minimum voltage that can drive the constant voltage devices.

* * * * *